US006893368B2

(12) United States Patent
Fujiwara et al.

(10) Patent No.: US 6,893,368 B2
(45) Date of Patent: May 17, 2005

(54) DRIVING FORCE TRANSMISSION APPARATUS

(75) Inventors: Hideki Fujiwara, Nara-ken (JP); Taku Adaniya, Kariya (JP); Shigeo Fukushima, Kariya (JP); Masahiro Kawaguchi, Kariya (JP); Kazuhiko Minami, Kariya (JP); Akinobu Kanai, Kariya (JP); Tomoharu Arai, Kariya (JP)

(73) Assignees: Koyo Seiko Co., Ltd (JP); Kabushiki Kaisha Toyota Jidoshokki (JP)

( * ) Notice: Subject to any disclaimer, the term of this patent is extended or adjusted under 35 U.S.C. 154(b) by 105 days.

(21) Appl. No.: 10/200,593

(22) Filed: Jul. 23, 2002

(65) Prior Publication Data

US 2003/0017899 A1 Jan. 23, 2003

(30) Foreign Application Priority Data

Jul. 23, 2001 (JP) ........................................ 2001-221475

(51) Int. Cl.[7] .............................................. F16H 61/00
(52) U.S. Cl. .......................................... 474/70; 60/698
(58) Field of Search ............................ 474/70, 199, 74; 192/45, 45.1, 110 B; 60/698, 699; 310/75 R, 76, 78, 92

(56) References Cited

U.S. PATENT DOCUMENTS

| 3,789,618 A | * | 2/1974 | Feliz ........................... 62/236 |
| 4,706,520 A | * | 11/1987 | Sivalingam ................. 475/140 |
| 5,827,143 A | * | 10/1998 | Monahan et al. ............. 474/73 |
| 6,071,206 A | * | 6/2000 | Monahan et al. ........... 475/154 |
| 6,234,769 B1 | * | 5/2001 | Sakai et al. ................. 417/374 |
| 6,443,712 B2 | * | 9/2002 | Sakai et al. ................. 417/374 |

* cited by examiner

Primary Examiner—David A. Bucci
Assistant Examiner—Vicky A. Johnson
(74) Attorney, Agent, or Firm—Nixon & Vanderhye P.C.

(57) ABSTRACT

In this driving force transmission apparatus, with a simple constitution employing a one-way clutch 20 instead of an electromagnetic clutch, the driving force derived from the motor 33 can be transmitted to the rotating shaft 1 during engine stops, and the driving force of the engine can be transmitted to the rotating shaft 1 during engine operations. Also, the pulley 3 is held against the connecting portion 11 and the fixed-side member 26 by means of first and second two ball bearings 21, 30 disposed axially adjacent to first and second inner cylinder portions 6, 7, respectively, between which the opening portion 5 of the pulley 2 is interposed. This simple driving force transmission apparatus can switch between transmission and non-transmission of driving force from pulley to rotating shaft, and transmits the driving force of a motor directly to the rotating shaft in the non-transmission state.

10 Claims, 3 Drawing Sheets

DRIVING FORCE TRANSMISSION APPARATUS

BACKGROUND OF THE INVENTION

The present invention relates to a driving force transmission apparatus for driving a compressor into rotation with a motor, for example, upon engine stops such as idle stops of an automobile.

In this type of driving force transmission apparatus, it has conventionally been practiced that an electromagnetic clutch is provided, for example, between a rotating shaft for driving the compressor and a pulley for transmitting the rotation of the engine to the rotating shaft, where this electromagnetic clutch is kept ON during the rotation of the engine so that the rotational driving force is transmitted from the pulley to the rotating shaft, while the electromagnetic clutch is kept OFF during the stop of the engine so that the rotating shaft and the pulley are disconnected from each other, and the rotating shaft is driven into rotation with a motor.

However, this conventional driving force transmission apparatus, because of its needing an electromagnetic clutch as well as its on/off control, has had a problem of complicated structure.

SUMMARY OF THE INVENTION

Therefore, an object of the present invention is to provide a driving force transmission apparatus which, with a simple-in-structure, compact and rigid constitution, can switch between transmission and non-transmission of driving force from pulley to rotating shaft depending on whether or not driving force is applied to the pulley, and which, during this non-transmission, transmits the driving force of a motor directly to the rotating shaft.

In order to achieve the above object, there is provided a driving force transmission apparatus comprising:
  a rotating shaft for transmitting rotational driving force;
  a pulley positioned outside the rotating shaft;
  a connecting portion fixed to the rotating shaft for directly transmitting driving force of a motor to the rotating shaft,
  an inner cylinder portion of the pulley having a first inner cylinder portion and a second inner cylinder portion which are axially adjacent to each other with an opening portion interposed therebetween,
  a first rolling bearing and a one-way clutch each of which is disposed between the first inner cylinder portion and the connecting portion, the first rolling bearing having one array of rolling elements; and
  a second rolling bearing disposed between the second inner cylinder portion and a fixed-side member.

In this driving force transmission apparatus of the invention, the pulley is held against the connecting portion and the fixed-side member by means of the first and second two rolling bearings which are disposed axially adjacent to each other with the opening portion of the inner cylinder portion of the pulley interposed therebetween. Thus, since the pulley is held against the connecting portion and the fixed-side member by the two rolling bearings spaced from each other, the pulley can be prevented from tilting with respect to the rotational center axis even if bending moment is applied to the pulley due to the load derived from the belt. As a result, the driving force transmission apparatus can be prevented from earlier breakage due to engagement failures of the one-way clutch and local abrasion of raceway portions.

Also in the driving force transmission apparatus of this invention, since the rolling elements of the first ball bearing are in one array, compacting in the axial direction can be implemented.

In one embodiment of the present invention, the rolling elements of the first rolling bearing are balls.

In the driving force transmission apparatus of this embodiment, since the rolling elements of the first rolling bearing are given by balls, compacting in the axial direction can be implemented. Furthermore, positioning in both radial and axial directions can be achieved simultaneously.

In one embodiment of the present invention, an inner ring of the one-way clutch and an inner ring of the first rolling bearing are integrally formed as an integral inner ring, and an outer ring of the one-way clutch and an outer ring of the first rolling bearing are integrally formed as an integral outer ring.

In the driving force transmission apparatus of this embodiment, since inner and outer rings of the one-way clutch and inner and outer rings of the first rolling bearing are provided as integral inner and outer rings, compacting in the axial direction can be implemented.

In one embodiment of the present invention, an outer circumferential surface of the first inner cylinder portion of the pulley and an inner circumferential surface of the integral inner ring each have a screw portion.

In the driving force transmission apparatus of this embodiment, since the pulley and the inner ring of the one-way clutch can directly be tightened together by the screw portion, the driving force transmission apparatus can be simplified in structure as a whole.

In one embodiment of the present invention, the first inner cylinder portion has an inner circumferential surface which defines a tool fitting hole.

In the driving force transmission apparatus of this embodiment, since the inner circumferential surface of the first inner cylinder portion of the pulley defines a tool fitting hole, the pulley can be screwed and tightened with the integral inner ring at the screw portion, in assembly process, by fitting a specified tool into this tool fitting hole and turning the pulley.

In one embodiment of the present invention, the connecting portion has a cylinder portion which is to be fitted to an axial end portion of the rotating shaft,
  the cylinder portion having a screw portion which is to be fitted to the screw portion of the axial end portion of the rotating shaft and a tool fitting hole which is opened at an axial ends and
  the axial end portion of the rotating shaft having a tool fitting hole or a tool fitting protrusion.

In the driving force transmission apparatus of this embodiment, when the cylinder portion of the connecting portion and the screw portion of the axial end portion of the rotating shaft are screwed together, a fitting portion of a specified tool is fitted to the axially opened tool fitting hole of the cylinder portion of the connecting portion in such a manner that their relative rotation is inhibited, and further another fitting portion of the specified tool is fitted to the tool fitting hole or tool fitting protrusion of the axial end portion of the rotating shaft in such a manner that their relative rotation is inhibited. Then, by rotating the two fitting portions of the tool relative to each other, the screw portion of the cylinder portion of the connecting portion is screwed with the screw portion of the axial end portion of the rotating shaft, by which the connecting portion can be tightened to the rotating shaft. As a result of this, the driving force transmission apparatus can be improved in assemblability.

In one embodiment of the present invention, the motor is fixed to a motor fixing portion having an inner cylinder portion, which is interposed between the fixed-side member and the second rolling bearing, a flange portion extending through the opening portion, and an outer cylinder portion, the inner cylinder portion of the motor fixing portion and the fixed-side member being fitted to each other in serrations or by a spline or a key, and the inner cylinder portion of the motor fixing portion being held axially by a snap ring fitted to the fixed-side member.

In the driving force transmission apparatus of this embodiment, since the motor is fixed at the outer cylinder portion of the motor fixing portion, the motor can be disposed inside the pulley. Further, the motor fixing portion, whose inner cylinder portion is interposed between the second rolling bearing and the fixed-side member, is prevented from turning by serration-fitting or spline-fitting or key-fitting, and further prevented from axially loosening off by the snap ring fitted to the fixed-side member. As a result of this, the driving force transmission apparatus can be improved in assemblability and disassemblability.

In one embodiment of the present invention, the motor is disposed inside the pulley.

In the driving force transmission apparatus of this embodiment, since the motor is disposed inside the pulley, the driving force transmission apparatus can be made more compact by effectively utilizing the internal space of the pulley as a placement space for the motor.

In one embodiment of the present invention, a rotor of the motor is integrated with the connecting portion.

In the driving force transmission apparatus of this embodiment, since the rotor of the motor is integrated with the connecting portion, the driving force transmission apparatus can be made even more compact.

In one embodiment of the present invention, the driving force transmission apparatus is used for an auxiliary machine of an automobile.

In the driving force transmission apparatus of this embodiment, by using the driving force transmission in an auxiliary machine of an automobile, transmission and non-transmission of driving force from pulley to rotating shaft can be switched over depending on whether or not driving force is applied to the pulley, with a simple-in-structure, compact and rigid constitution. During the non-transmission, the auxiliary machine of the automobile can be driven by transmitting the driving force of the motor directly to the rotating shaft.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the present invention is described in detail by way of embodiments thereof illustrated in the accompanying drawings.

First Embodiment

Figure 1:
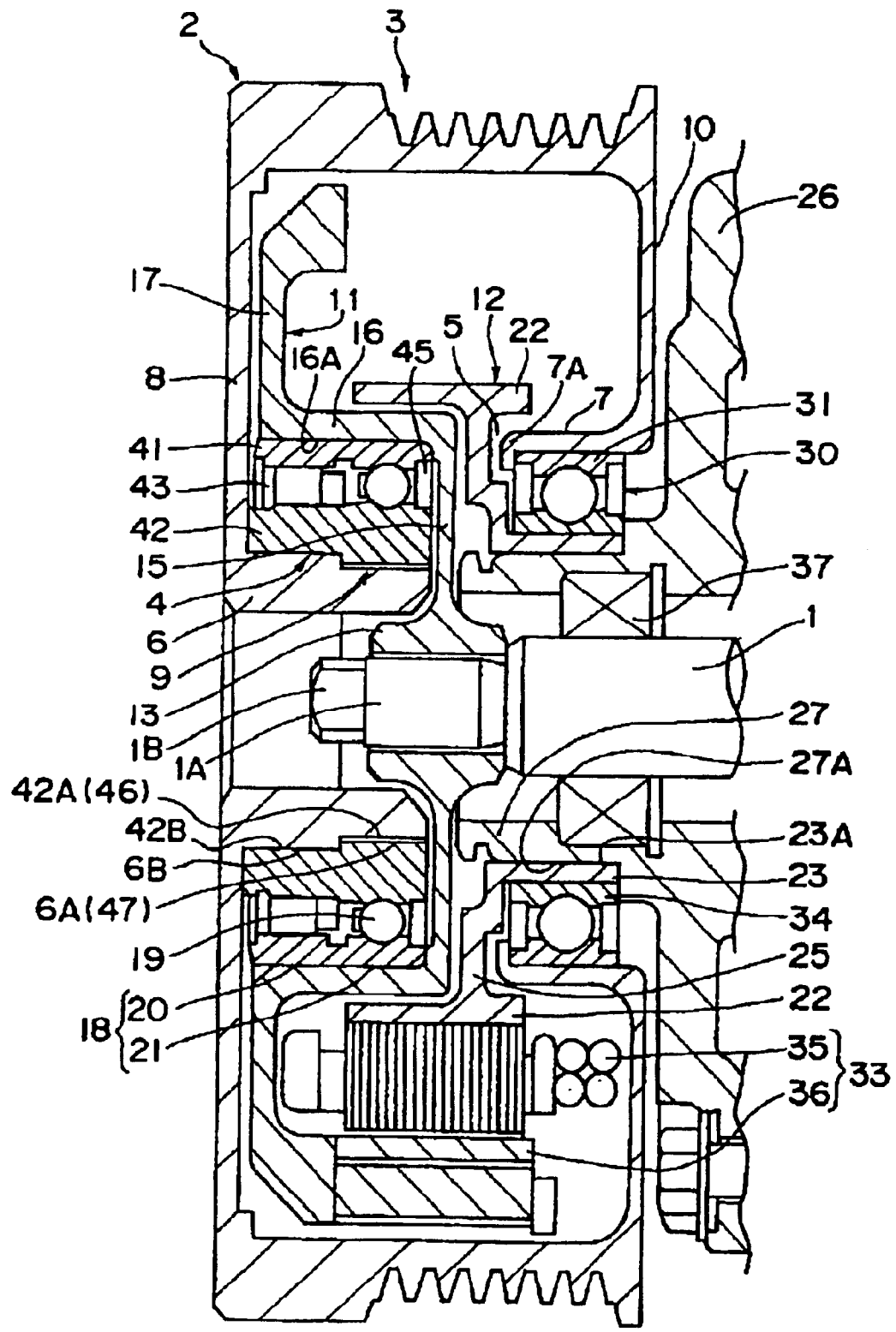
FIG. 1 is a sectional view of a first embodiment of the driving force transmission apparatus according to the present invention.

FIG. 1 shows a cross section of a first embodiment of the driving force transmission apparatus according to the present invention. The driving force transmission apparatus of this first embodiment includes a rotating shaft 1 for transmitting rotational driving force to an auxiliary machine such as a compressor, and a pulley 2 which is disposed outside the rotating shaft 1 and capable of transmitting driving force of an external drive unit such as an engine to the rotating shaft 1 via a belt (not shown).

This pulley 2 has an outer cylinder portion 3 around which the belt is wound, and a first inner cylinder portion 6 and a second inner cylinder portion 7 axially adjacent to each other with an opening portion 5 interposed therebetween. The pulley 2 also has a first side face portion 8 continuing from an end of the outer cylinder portion 3 to the first inner cylinder portion 6, and a second side face portion 10 continuing from the other end of the outer cylinder portion 3 to the second inner cylinder portion 7.

The driving force transmission apparatus of this embodiment further includes a connecting portion 11 and a motor fixing portion 12, each of which extends inside the pulley 2 through the opening portion 5 of the pulley 2.

The connecting portion 11 has an inner cylinder portion 13 having a female screw portion to be screwed with a male screw portion of an axial end portion 1A of the rotating shaft 1 as well as a flange portion 15 radially extending from this inner cylinder portion 13 and passing through the opening portion 5, and an outer cylinder portion 16 axially bent from this flange portion 15 as well as a disc portion 17 radially extending from this outer cylinder portion 16 along the inner side face of the first side face portion 8 and axially inwardly bent inside the outer cylinder portion 3 of the pulley 2.

Between the outer cylinder portion 16 of this connecting portion 11 and the first inner cylinder portion 6 of the pulley 2 is disposed a one-way clutch unit 18. This one-way clutch unit 18 is composed of a one-way clutch 20 and a ball bearing 21 having balls 19, serving as a first rolling bearing and being axially (on the opening portion 5 side) adjacent to this one-way clutch 20.

The one-way clutch unit 18 includes an integral outer ring 41 in which the outer ring of the clutch 20 and the outer ring of the ball bearing 21 are integrated together, and an integral inner ring 42 in which the inner ring of the clutch 20 and the inner ring of the ball bearing 21 are integrated together. Also, in this one-way clutch unit 18, sealing devices 43, 45 are disposed at both axial ends, and the one-way clutch unit 18 is internally lubricated with grease.

The integral inner ring 42 of this one-way clutch unit 18 has a female screw 46 formed in its bearing-side inner-diameter surface 42A, and a clutch-side inner-diameter surface 42B is larger in diameter than the bearing-side inner-diameter surface 42A. Meanwhile, the first inner cylinder portion 6 of the pulley 2 has a male screw 47 formed in its opening-side outer circumferential surface 6A, and a side-face side outer circumferential surface 6B is larger in diameter than the opening-side outer circumferential surface 6A. Then, the male screw 47 of the opening-side outer circumferential surface 6A of this pulley 2 is screwed with the female screw 46 of the bearing-side inner-diameter surface 42A of the integral inner ring 42, while the side-face side outer circumferential surface 6B of the pulley 2 is faucet jointed with the clutch-side inner circumferential surface 42B of the integral inner ring 42.

This side-face side outer circumferential surface 6B and the clutch-side inner circumferential surface 42B of the integral inner ring 42 constitute a faucet joint portion 4, while the male screw 47 of the pulley 2 and the female screw 4G of the integral inner ring 42 constitute a screw portion 9.

Also, the integral outer ring 41 of the one-way clutch unit 18 is press-fitted into an inner-diameter surface 16A of the outer cylinder portion 16 of the connecting portion 11. In this embodiment, the one-way clutch unit 18 is so arranged that the ball bearing 21 is disposed on one side closer to a later-described ball bearing 30 serving as a second rolling bearing, i.e., on the flange portion 15 side of the connecting portion 11 in this case.

Meanwhile, the motor fixing portion 12, which is disposed next to the connecting portion 11 with a specified spacing therebetween, includes an outer cylinder portion 22 inside the pulley 2, an inner cylinder portion 23 outside the pulley 2, and a flange portion 25 radially extending from an axial end of this inner cylinder portion 23 and passing through the opening portion 5 to be contiguous to the outer cylinder portion 22. The inner cylinder portion 23 of this motor fixing portion 12 has an inner-diameter surface 23A of the motor fixing portion 12 press-fitted into an outer circumferential surface 27A of a cylinder portion 27 of a fixed-side member 26.

The ball bearing 30 as the second rolling bearing is disposed between the inner cylinder portion 23 of the motor fixing portion 12 and the second inner cylinder portion 7 of the pulley 2. The outer-diameter surface of the inner cylinder portion 23 of the motor fixing portion 12 is press-fitted into the inner circumferential surface of an inner ring 34 of the ball bearing 30. Further, an axial end 7A of the second inner cylinder portion 7 of the pulley 2 is radially inwardly bent so as to be in contact with an end face of an outer ring 31 of the ball bearing 30.

A stator 35 of a motor 33 is fixed at the outer cylinder portion 22 of the motor fixing portion 12, and a rotor 36 is disposed opposite to a radial outside of the stator 35. This rotor 36 is fixed at a fore end of the disc portion 17 of the connecting portion 11, and integrated with the connecting portion 11.

Further, a sealing device 37 is disposed between the cylinder portion 27 of the fixed-side member 26 and the rotating shaft 1. Also, a fore end portion 1B of the rotating shaft 1 is formed into a hexagonal (or oval-shaped) head portion.

In the driving force transmission apparatus having the above constitution, the one-way clutch 20 idly rotates while the rotational speed transmitted from the motor 33 by the connecting portion 11 is faster than the rotational speed transmitted from the engine by the pulley 2.

Accordingly, for example, at an idle stop during which the motor 33 is driven and the engine is halted, the one-way clutch 20 idly rotates, and the pulley 2 idly rotates relative to the connecting portion 11, so that no rotational driving force is transmitted from the pulley 2 to the connecting portion 11. Thus, the driving force of the motor 33 is transmitted directly from the connecting portion 11 to the rotating shaft 1, meaning that the auxiliary machine is driven by the motor 33.

On the other hand, while the engine is rotating and the rotational driving force transmitted to the one-way clutch 20 by the pulley 2 is faster than the rotational driving force transmitted from the connecting portion 11 to the rotating shaft 1, the driving force of the engine is transmitted from the pulley 2 to the rotating shaft 1 via the belt, meaning that the auxiliary machine is driven by the engine.

According to this embodiment, as shown above, with a simple constitution employing the one-way clutch 20 instead of an electromagnetic clutch, the driving force derived from the motor 33 can be transmitted to the rotating shaft 1 during engine stops, and the driving force of the engine can be transmitted to the rotating shaft 1 during engine operations.

Also in this embodiment, the pulley 2 is held against the connecting portion 11 and the fixed-side member 26 by means of the first and second two ball bearings 21, 30 disposed axially adjacent to the first and second inner cylinder portions 6, 7, respectively, between which the opening portion 5 of the pulley 2 is interposed. Thus, since the pulley 2 is held against the connecting portion 11 and the fixed-side member 26 by the two ball bearings 21, 30 spaced from each other, the pulley 2 can be prevented from tilting with respect to the rotational center axis even if bending moment is applied to the pulley 2 due to the load derived from the belt. As a result, the driving force transmission apparatus can be prevented from earlier breakage due to engagement failures of the one-way clutch 20 and local abrasion of raceway portions.

Also in the driving force transmission apparatus of this embodiment, since the motor 33 is disposed in the internal space of the pulley 2, the driving force transmission apparatus can be made more compact by effectively utilizing the internal space of the pulley 2 as a placement space for the motor 33. Further, in this embodiment, since the rotor 36 of the motor 33 is integrated with the connecting portion 11, the driving force transmission apparatus can be made even more compact. In this embodiment, also, since the balls 19 as the rolling elements of the first ball bearing 21 are in one array, compacting in the axial direction can be implemented. Also in this embodiment, the rolling elements of the ball bearing 21 are given by the balls 19, compacting in the axial direction can be implemented to larger extents than in the case where roller bearings are adopted. Furthermore, positioning in both radial and axial directions can be achieved simultaneously.

The one-way clutch unit 18 is covered from axial both sides with the first side face portion 8 of the pulley 2 and the flange portion 15 of the connecting portion 11, and moreover covered from radial both sides with the first inner cylinder portion 6 of the pulley 2 and the outer cylinder portion 16 of the connecting portion 11. By virtue of this structure, the driving force transmission apparatus can be provided in such a structure that external dust or muddy water can hardly enter into the one-way clutch unit 18, which allows an enhancement of sealing performance. Furthermore, the cost required for the sealing devices 43, 45 at axial both ends can be reduced.

Also, since the integral outer ring 41 and the integral inner ring 42 are provided in common to the one-way clutch 20 and the ball bearing 21, the one-way clutch unit 18 can be shortened in its axial size.

Second Embodiment

Figure 2:
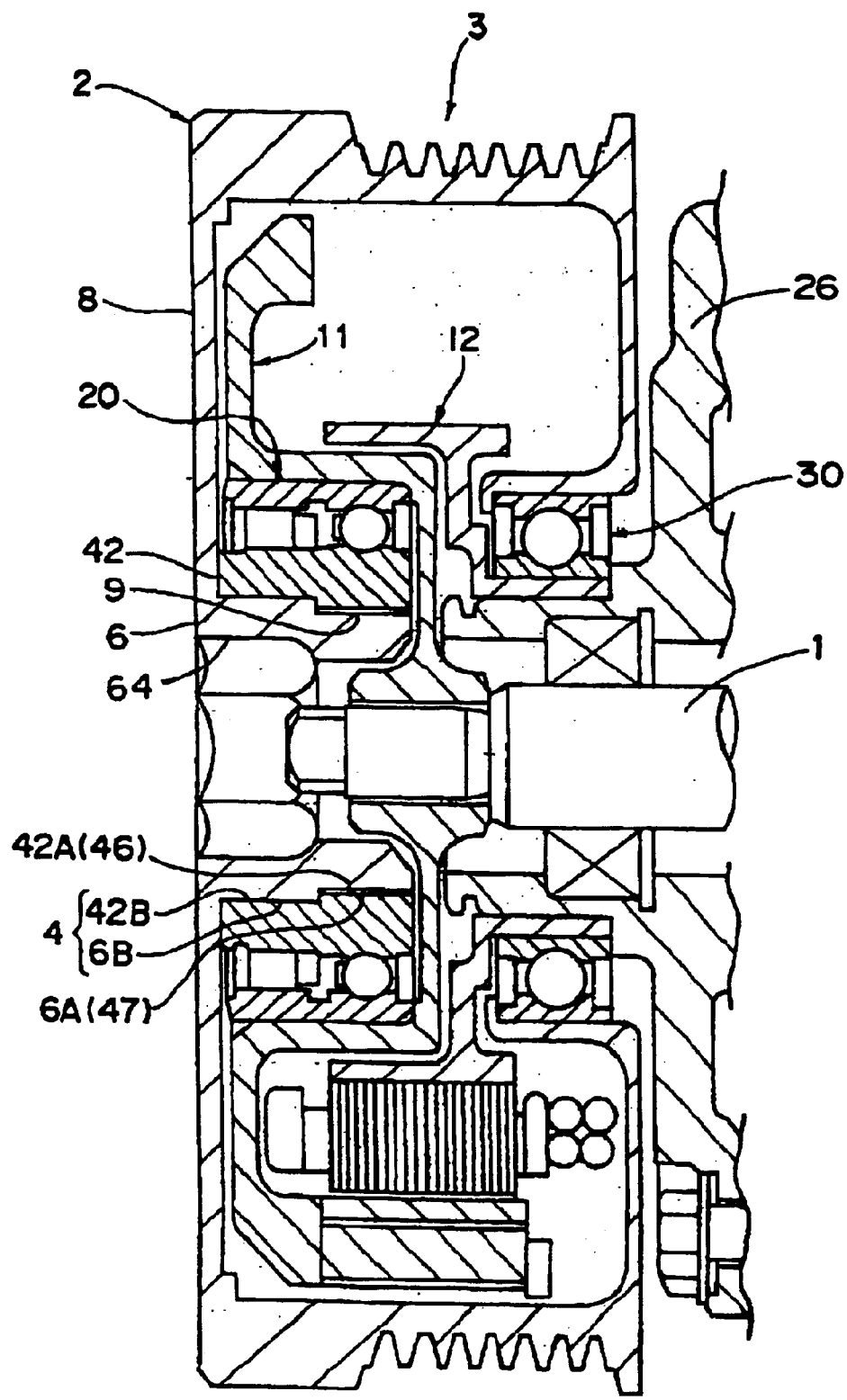
FIG. 2 is a sectional view of a second embodiment of the driving force transmission apparatus according to the present invention.

Next, FIG. 2 shows a sectional view of a second embodiment of the present invention. This second embodiment differs from the foregoing first embodiment only in that the first inner cylinder portion 6 of the pulley 2 has a hexagonal-cylindrical-shaped inner circumferential surface 61 as a tool fitting hole.

In this second embodiment, as in the first embodiment, the side-face side outer circumferential surface 6B of the first inner cylinder portion 6 and the clutch-side outer circumferential surface 42B of the integral inner ring 42 constitute the faucet joint portion 4, and the male screw 47 of the pulley 2 and the female screw 46 of the integral inner ring 42 constitute the screw portion 9. Accordingly, since the pulley 2 and the integral inner ring 42 can directly be tightened together by the faucet joint portion 4 and the screw portion 9, the driving force transmission apparatus can be simplified in structure as a whole. It is noted that this faucet joint portion 4 may be omitted.

Also in this second embodiment, since the hexagonal-cylindrical-shaped inner circumferential surface 61 of the first inner cylinder portion 6 of the pulley 2 defines a hexagonal hole 64, the pulley 2 can be screwed and tightened with the integral inner ring 42 at the screw portion 9, in assembly process, by fitting a hexagonal bar as a specified tool into this hexagonal hole 64 and turning the pulley 2. Thus, the driving force transmission apparatus can be improved in assemblability.

It is noted that the inner circumferential surface of the first inner cylinder portion 6 of the pulley 2 may be provided in any form, without being limited to the hexagonal hole 64, only if it can be fitted to a tool shape so as to be unrotatable.

Further in this second embodiment, a plurality of axial holes may be formed in the first side face portion 8 of the pulley 2 circumferentially with specified spacings from one another instead of the hexagonal hole 64 so that these axial holes can serve as holes for tool fitting.

Third Embodiment

Figure 3:
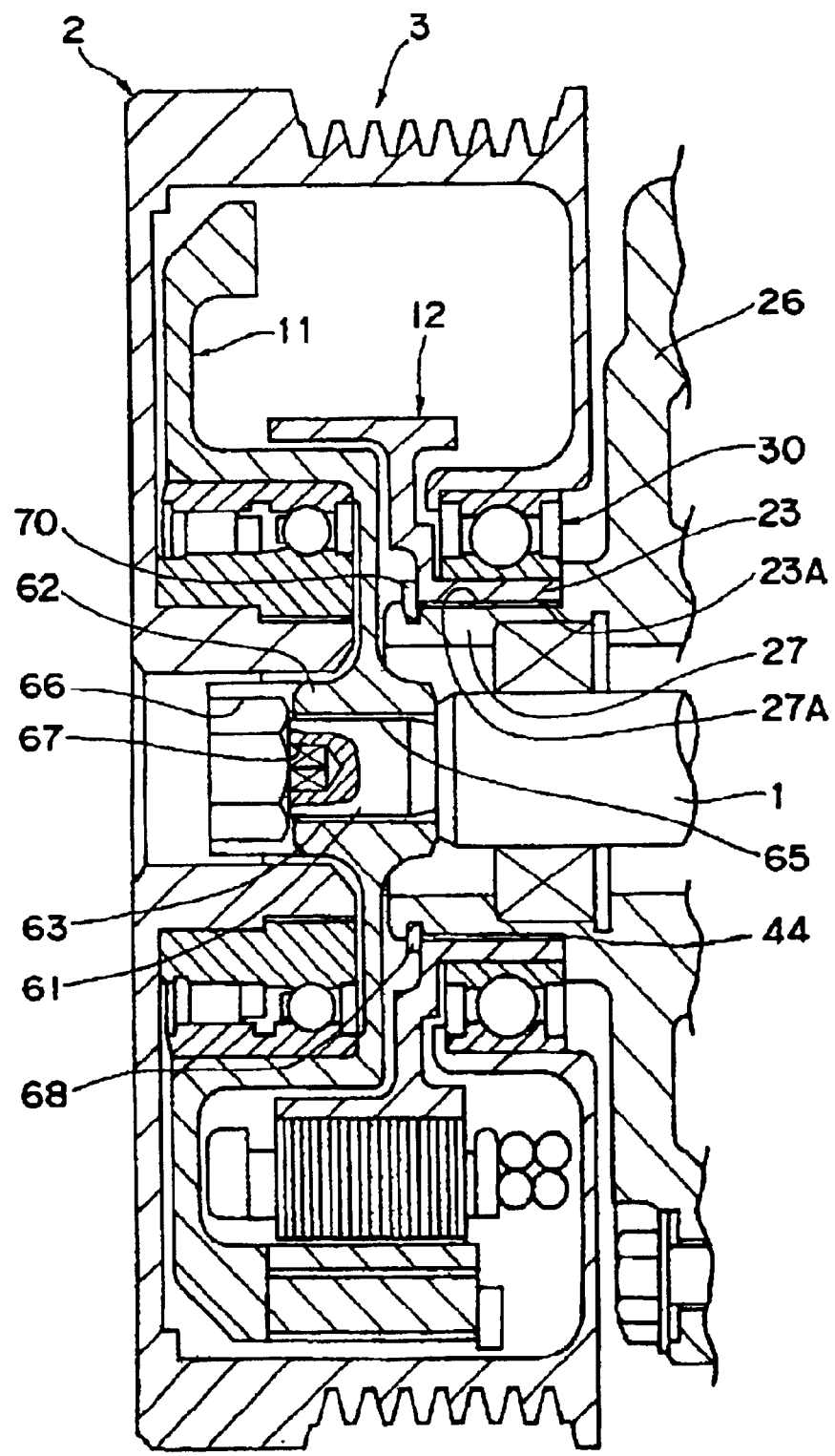
FIG. 3 is a sectional view of a third embodiment of the driving force transmission apparatus according to the present invention.

Next, FIG. 3 shows a sectional view of a third embodiment of the present invention. This third embodiment differs from the foregoing first embodiment in the following (1) to (4) points of structure:

(1) The connecting portion 11 has a cylinder portion 62 to be fitted to an axial end 61 of the rotating shaft 1, and this cylinder portion 62 has a screw portion 65 to be screwed with a screw portion 63 of an axial end portion 61 of the rotating shaft 1, as well as a hexagonal hole 66 as a tool fitting hole which is adjacent to this screw portion 65 and open at an axial end;

(2) The axial end portion 61 of the rotating shaft 1 has a quadratic-prism-shaped tool fitting hole 67;

(3) Serrations 44 are formed in at least either one of the inner circumferential surface 23A of the inner cylinder portion 23 of the motor fixing portion 12 or the outer circumferential surface 27A of the cylinder portion 27 of the fixed-side member 26, where the inner cylinder portion 23 of the motor fixing portion 12 and the cylinder portion 27 of the fixed-side member 26 are engaged with each other in serrations; and (4) By means of a snap ring 70 fitted to an annular groove 68 formed in the outer circumferential surface 27A of the cylinder portion 27 of the fixed-side member 26, the inner cylinder portion 23 of the motor fixing portion 12 is axially held against the cylinder portion 27 of the fixed-side member 26.

In the driving force transmission apparatus of this third embodiment, when the cylinder portion 62 of the connecting portion 11 and the screw portion 63 of the axial end portion 61 of the rotating shaft 1 are screwed together, a fitting portion of a hexagonal bar or the like as a specified tool is fitted to the axially opened hexagonal hole 66 of the cylinder portion 62 of the connecting portion 11 in such a manner that their relative rotation is inhibited, and further a rectangular bar or the like as another fitting portion of the specified tool is fitted to the quadratic-prism-shaped tool fitting hole 67 of the axial end portion 61 of the rotating shaft 1 in such a manner that their relative rotation is inhibited. Then, by rotating the two fitting portions of the tool relative to each other, the screw portion 65 of the cylinder portion 62 of the connecting portion 11 is screwed with the screw portion 63 of the axial end portion 61 of the rotating shaft 1, by which the connecting portion 11 can be tightened to the rotating shaft 1. As a result of this, the driving force transmission apparatus can be improved in assemblability and disassemblability.

Also in this third embodiment, the motor fixing portion 12, whose inner cylinder portion 23 is interposed between the ball bearing 30 and the cylinder portion 27 of the fixed-side member 26, is prevented from turning by serration-fitting with the fixed-side member 26, and further prevented from axially loosening off by the snap ring 70 fitted to the cylinder portion 27 of the fixed-side member 26. As a result of this, the driving force transmission apparatus can be improved in assemblability and disassemblability.

In this third embodiment, serrations are formed in at least either one of the inner circumferential surface 23A of the inner cylinder portion 23 of the motor fixing portion 12 or the outer circumferential surface 27A of the cylinder portion 27 of the fixed-side member 26. However, a spline or key may be formed instead of the serrations so as to implement a spline or key fitting. Furthermore, a tool fitting protrusion may also be formed instead of the quadratic-prism-shaped tool fitting hole 67 at the axial end portion 61 of the rotating shaft 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving force transmission apparatus for an engine comprising:

a rotating shaft for transmitting rotational driving force;

a pulley positioned about the rotating shaft and driven by the engine;

a motor for generating a driving force;

a connecting portion fixed to the rotating shaft for directly transmitting the driving force of the motor to the rotating shaft;

an inner cylinder portion of the pulley having a first inner cylinder portion and a second inner cylinder portion which are axially adjacent to each other with an opening portion interposed therebetween, a first rolling bearing and a one-way clutch each disposed between the first inner cylinder portion and the connecting portion, said clutch disengaging between the first inner cylinder portion and the connecting portion at engine low speed enabling transmission of the driving force of the motor to the rotating shaft and being engaged between the first inner cylinder portion and the connecting portion at a higher engine speed enabling the pulley to drive said rotating shaft; and the first rolling bearing having an array of rolling elements, and a second rolling bearing disposed between the second inner cylinder portion and a fixed-side member.

2. The driving force transmission apparatus according to claim 1, wherein the rolling elements of the first rolling bearing are balls.

3. The driving force transmission apparatus according to claim 1, wherein an inner ring of the one-way clutch and an inner ring of the first rolling bearing are integrally formed as an integral inner ring, and an outer ring of the one-way clutch and an outer ring of the first rolling bearing are integrally formed as an integral outer ring.

4. The driving force transmission apparatus according to claim 3, wherein
an outer circumferential surface of the first inner cylinder portion of the pulley and an inner circumferential surface of the integral inner ring each have a screw portion.

5. The driving force transmission apparatus according to claim 3, wherein
the first inner cylinder portion has an inner circumferential surface which defines a tool fitting hole.

6. The driving force transmission apparatus according to claim 1, wherein
the connecting portion has a cylinder portion which is to be fitted to an axial end portion of the rotating shaft,
the cylinder portion having a screw portion which is to be fitted to the screw portion of the axial end portion of the rotating shaft and a tool fitting hole which is opened at an axial end, and
the axial end portion of the rotating shaft having a tool fitting hole or a tool fitting protrusion.

7. The driving force transmission apparatus according to claim 1, wherein
the motor is fixed to a motor fixing portion having an inner cylinder portion, which is interposed between the fixed-side member and the second rolling bearing, a flange portion extending through the opening portion, and an outer cylinder portion,
the inner cylinder portion of the motor fixing portion and the fixed-side member being fitted to each other in serrations or by a spline or a key, and
the inner cylinder portion of the motor fixing portion being held axially by a snap ring fitted to the fixed-side member.

8. The driving force transmission apparatus according to claim 1, wherein
the motor is disposed inside the pulley.

9. The driving force transmission apparatus according to claim 1, wherein
a rotor of the motor is integrated with the connecting portion.

10. The driving force transmission apparatus according to claim 1, wherein
the driving force transmission apparatus is used for an auxiliary machine of an automobile.

* * * * *